United States Patent Office 2,966,225
Patented Dec. 27, 1960

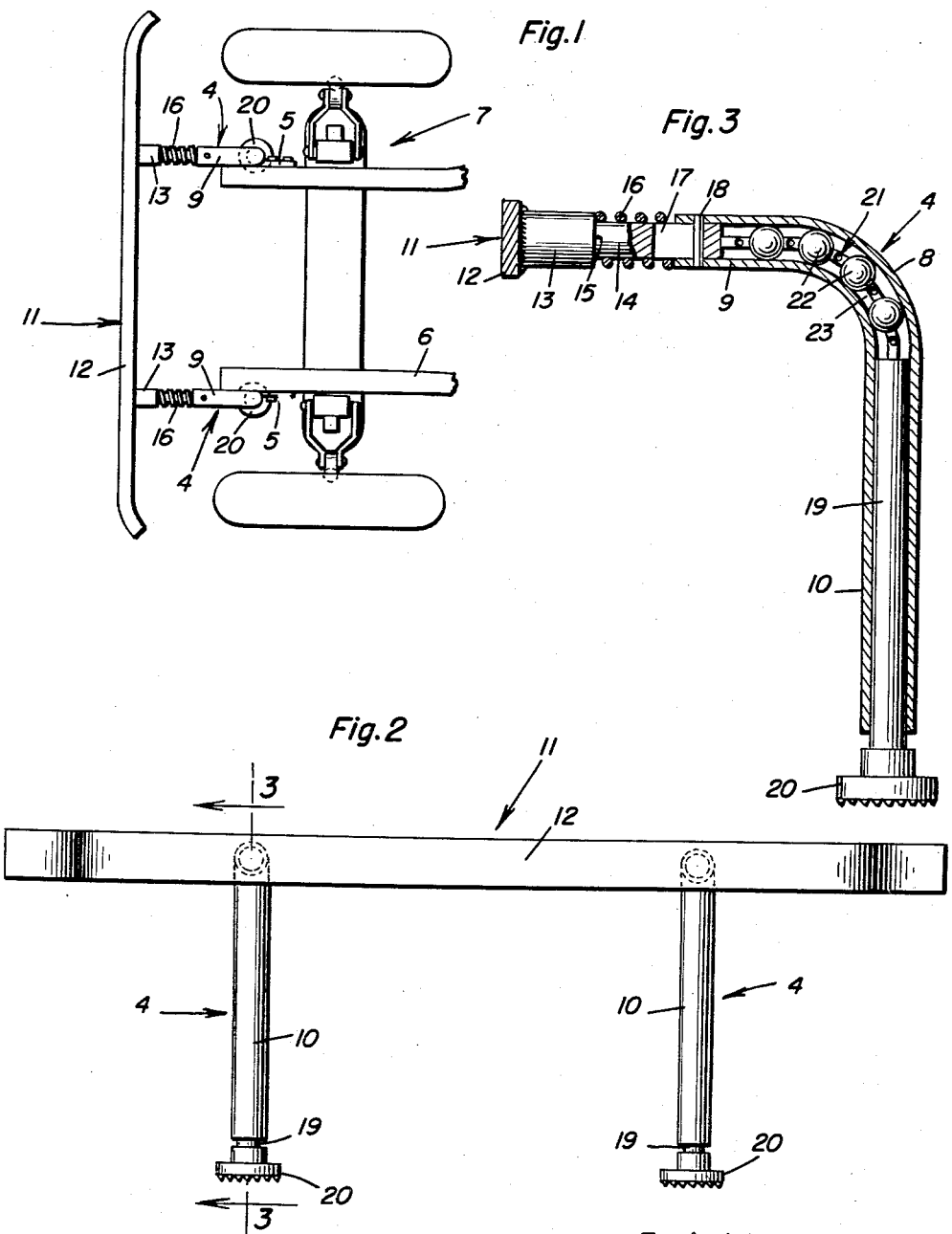

2,966,225

MOTOR VEHICLE BUMPER

Frederick M. Carroll, 3 West Place,
Cambridge A39, Mass.

Filed Feb. 18, 1958, Ser. No. 715,958

5 Claims. (Cl. 180—83)

The present invention relates to new and useful improvements in bumpers particularly for motor vehicles and has for its primary object to provide, in a manner as hereinafter set forth, novel means whereby, in the event of a collision, the major portion of the force of the impact will be transmitted to the ground or highway rather than to the vehicle.

Another important object of the invention is to provide a bumper of the character described which, when actuated, will function as a ground engaging brake for the vehicle.

Other objects of the invention are to provide a motor vehicle bumper of the aforementioned character which will be comparatively simple in construction, strong, durable, reliable, of light weight and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view, showing a bumper or guard constructed in accordance with the present invention mounted on the front of a motor vehicle;

Figure 2 is a view in front elevation of the device; and

Figure 3 is a vertical sectional view, taken substantially on the line 3—3 of Figure 2.

Referring now to the drawing in detail, it will be seen that the embodiment of the invention which has been illustrated comprises a pair of angular or bent tubular brackets of suitable metal or other material which are designated generally by the reference character 4. The tubular brackets 4, which may also be of any desired dimensions, are rigidly secured in any suitable manner, as at 5, on the forward end portion of the usual frame 6 of a conventional motor vehicle 7.

The tubular brackets 4 include arcuate intermediate portions 8, forwardly projecting, horizontal upper end portions 9 and depending vertical end portions 10.

Slidably mounted on the brackets 4 is a bumper 11. The bumper 11 includes a horizontal transverse bar 12 having fixed thereon at spaced points rearwardly projecting arms 13. The arms 13 comprise reduced rear end portions 14 which are slidably engaged in the end portions 9 of the tubular brackets 4. The reduced end portions 14 provide shoulders 15 on the arms 13. Coil springs 16 on the reduced portions 14 of the arms 13 are engaged with the upper ends of the brackets 4 and the shoulders 15 for yieldingly resisting rearward movement of said arms in said brackets. The reduced end portions 14 of the arms 13 have formed therein longitudinal slots 17 which accommodate stop pins 18 in the forward end portions 9 of the brackets 4. It is to be appreciated that the respective dimensions of each of the elements set forth may be varied in accordance with the amount of clearance required between the road surface and the portions of the device as determined by the spring suspension of the vehicle and type of road on which the vehicle may be used.

Slidably mounted in the end portions 10 of the tubular brackets 4 are metallic shafts or rods 19. The shafts or rods 19 are provided on their lower ends with toothed ground engaging shoes 20. The rods 19 are connected to the arms 13 for actuation thereby through the medium of flexible shafts 21 which are slidable in the arcuate intermediate portions 8 of the tubular brackets 4. The flexible shafts 21 comprise metallic spheres or balls 22 which are pivotally connected as at 23.

It is thought that the operation of the device will be readily apparent from a consideration of the foregoing. Briefly, the shoes 20 are normally maintained in raised or inoperative position as shown in the drawing by the coil springs 16. In the event of a collision the arms 13 are moved rearwardly in the end portions 9 of the tubular brackets 4 against the tension of the coil springs 16, said coil springs absorbing the initial shock. Through the medium of the flexible shafts 21 the arms 13 force the rods 19 downwardly in the end portions 10 of the tubular brackets 4 for engaging the feet 20 with the ground or highway. In this manner the major portion of the blow is transmitted directly to the ground or highway rather than to the motor vehicle 7. When the pressure has been removed from the bar 12 said bar is returned to its forward position by the coil springs 16, which operation also elevates the shoes 20 to inoperative or retracted position.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A motor vehicle bumper comprising: a pair of tubular brackets mounted on the vehicle, said brackets including horizontal, forwardly projecting upper end portions and further including depending vertical lower end portions, a bumper bar, arms on said bumper bar slidably engaged in said upper end portions of said brackets, rods slidably mounted in said lower end portions of said brackets, ground engaging shoes on the lower ends of said rods, and means operatively connecting the rods to the arms for actuation thereby, said brackets further including arcuate intermediate portions, said means comprising flexible shafts operable in said intermediate portions of said brackets and having ends connected to the arms and the rods.

2. The combination of claim 1 including springs disposed between said bumper bar arms and said brackets resistant to relative slidable movement.

3. A motor vehicle bumper comprising: a pair of tubular brackets mounted on the vehicle, said brackets including horizontal, forwardly projecting upper end portions and further including depending vertical lower end portions, a bumper bar, arms on said bumper bar slidably engaged in said upper end portions of said brackets, rods slidably mounted in said lower end portions of said brackets, ground engaging shoes on the lower ends of said rods, and means operatively connecting the rods to the arms for actuation thereby, said brackets further including arcuate intermediate portions, said means comprising flexible shafts operable in said intermediate portions of said brackets and having ends connected to the arms and the rods, said flexible shafts including a plurality of pivotally connected spheres.

4. The combination of claim 3 including springs disposed between said bumper bar arms and said brackets resistant to relative slidable movement.

5. A motor vehicle bumper comprising: a pair of tubular brackets mounted on the vehicle, said brackets including arcuate intermediate portions, horizontal forwardly projecting upper end portions and vertical depending lower end portions, a bumper bar, arms on said bumper bar slidably engaged in said upper end portions of said brackets, rods slidable in said lower end portions of said brackets, ground engaging shoes on the lower ends of said rods, flexible shafts operable in said arcuate intermediate portions having ends thereof connected to the arms and rods, and means for yieldingly resisting rearward sliding movement of the arms in the brackets, said arms including reduced end portions slidable in the brackets and providing shoulders, the last named means including coil springs mounted under compression on said reduced end portions of said arms and engaged with the brackets and said shoulders.

References Cited in the file of this patent

UNITED STATES PATENTS

| | | |
|---|---|---|
| 1,804,184 | Segal | May 5, 1931 |
| 1,956,491 | Capogreco | Apr. 24, 1934 |
| 2,843,224 | Landman et al. | July 15, 1958 |